US010661737B2

(12) United States Patent
Shiraishi et al.

(10) Patent No.: US 10,661,737 B2
(45) Date of Patent: May 26, 2020

(54) ENERGY STORAGE APPARATUS AND METHOD FOR DETERMINING MISUSE OF ENERGY STORAGE DEVICE

(71) Applicant: GS Yuasa International Ltd., Kyoto-shi (JP)

(72) Inventors: Takeyuki Shiraishi, Kyoto (JP); Masashi Nakamura, Kyoto (JP); Takeshi Nakamoto, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 301 days.

(21) Appl. No.: 15/409,858

(22) Filed: Jan. 19, 2017

(65) Prior Publication Data

US 2017/0210311 A1   Jul. 27, 2017

(30) Foreign Application Priority Data

Jan. 22, 2016  (JP) ................................. 2016-010731

(51) Int. Cl.
*B60R 16/033* (2006.01)
*H01M 10/42* (2006.01)
(Continued)

(52) U.S. Cl.
CPC ............ *B60R 16/033* (2013.01); *B60R 16/04* (2013.01); *H01M 10/425* (2013.01);
(Continued)

(58) Field of Classification Search
CPC .......... B60L 3/00; B60L 11/18; B60R 16/033; B60R 16/04; H02J 7/00; H01M 10/42; H02H 7/18
See application file for complete search history.

(56) References Cited

U.S. PATENT DOCUMENTS 6,060,185 A * 5/2000 Okutoh ............ G01R 19/16542
429/7
2006/0279086 A1  12/2006 Kishibata et al.
(Continued)

FOREIGN PATENT DOCUMENTS

JP    H10-136576 A    5/1998
JP    2004-342377 A   12/2004
(Continued)

OTHER PUBLICATIONS

Japanese Office Action dated Jul. 16, 2019, in Japanese Patent Application No. 2016-010731 with an English translation.

*Primary Examiner* — Jared Fureman
*Assistant Examiner* — Emmanuel Dominique
(74) *Attorney, Agent, or Firm* — McGinn IP Law Group, PLLC

(57) ABSTRACT

An energy storage apparatus includes: an energy storage device which is connected to a vehicle load and a vehicle power generator; a current interrupt device that causes the energy storage device and the vehicle load as well as the energy storage device and the vehicle power generator to be in a conduction state or in an interruption state; a voltage detection unit that detects voltage of the energy storage device; and a control unit. The control unit executes: a switching instruction process in which, when determining that the electric storage device will reach an overcharge state on the basis of the voltage, the control unit issues an interruption switching instruction to the current interrupt device; and an interruption maintaining process in which, when the number of times of the switching instruction process exceeds a predetermined value, the control unit issues an instruction to maintain the interruption state.

22 Claims, 10 Drawing Sheets

(51) Int. Cl.
  *H02J 7/00* (2006.01)
  *H01M 10/48* (2006.01)
  *B60R 16/04* (2006.01)
  *H01M 10/052* (2010.01)

(52) U.S. Cl.
  CPC ........... *H01M 10/482* (2013.01); *H02J 7/007* (2013.01); *H02J 7/0031* (2013.01); *H02J 7/0063* (2013.01); *H01M 10/052* (2013.01); *H02J 7/00302* (2020.01); *H02J 2007/0067* (2013.01); *Y02E 60/122* (2013.01)

(56) References Cited

U.S. PATENT DOCUMENTS

| | | | |
|---|---|---|---|
| 2009/0189568 | A1 | 7/2009 | Vasselin et al. |
| 2011/0313613 | A1* | 12/2011 | Kawahara ........... H01M 10/441 701/34.4 |
| 2012/0049787 | A1 | 3/2012 | Kuroiwa |
| 2012/0050054 | A1 | 3/2012 | Fujiwara |
| 2012/0217797 | A1* | 8/2012 | Butzmann ........... H01M 10/441 307/9.1 |
| 2013/0249496 | A1 | 9/2013 | Ju et al. |
| 2014/0320070 | A1* | 10/2014 | Nakamoto ............. B60L 58/10 320/107 |
| 2016/0043398 | A1* | 2/2016 | Yanagihara ......... H01M 10/052 307/10.1 |
| 2016/0285291 | A1 | 9/2016 | Nakamoto et al. |
| 2016/0336793 | A1* | 11/2016 | Seman, Jr. ................ H02J 7/00 |
| 2017/0297517 | A1* | 10/2017 | Fassnacht ............... B60R 16/03 |

FOREIGN PATENT DOCUMENTS

| | | |
|---|---|---|
| JP | 2006-344447 A | 12/2006 |
| JP | 2007-218666 A | 8/2007 |
| JP | 2009-183139 A | 8/2009 |
| JP | 2011-055647 A | 3/2011 |
| JP | 2011-217428 A | 10/2011 |
| JP | 2012-049030 A | 3/2012 |
| JP | 2012-050266 A | 3/2012 |
| JP | 2013-201888 A | 10/2013 |
| JP | 2014-082135 A | 5/2014 |
| JP | 2014-082863 A | 5/2014 |
| JP | 2014-203719 A | 10/2014 |
| JP | 2014-217169 A | 11/2014 |
| JP | 2014-225942 A | 12/2014 |
| JP | 2014-225955 A | 12/2014 |
| JP | 2016104600 A * | 12/2014 |

* cited by examiner

ENERGY STORAGE APPARATUS AND METHOD FOR DETERMINING MISUSE OF ENERGY STORAGE DEVICE

CROSS-REFERENCE TO RELATED APPLICATIONS

This application claims the benefit of Japanese patent application No. 2016-010731 filed on Jan. 22, 2016, which is incorporated by reference.

FIELD

The technique disclosed in the present specification relates to an energy storage apparatus and a method for determining misuse of an energy storage device.

BACKGROUND

JP 2014-225942 A discloses an energy storage system for starting an engine of a vehicle. This energy storage system uses, in place of a lead-acid battery, an energy storage device (secondary battery), such as a nickel hydrogen battery or a lithium ion battery, which is lower in charge voltage than a lead-acid battery.

The energy storage system of this type uses a control method different from that of a lead-acid battery. Since this energy storage system is mounted to a vehicle, the outer shape thereof or the shape of a communication connector thereof are similar to those of the lead-acid battery. If the energy storage device (secondary battery) having lower charge voltage than a lead-acid battery is mounted, by mistake, to a lead-acid battery vehicle, this energy storage device is charged similarly to the lead-acid battery. Then, the energy storage device is overcharged to cause some troubles.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide a technique to prevent the occurrence of troubles on an energy storage device.

An energy storage apparatus according to an aspect of the present invention is mounted to a vehicle, and includes: an energy storage device connected to a vehicle load and a vehicle power generator which are mounted on the vehicle; a current interrupt device that causes the energy storage device and the vehicle load as well as the energy storage device and the vehicle power generator to be in a conduction state or in an interruption state; a voltage detection unit that detects voltage of the energy storage device; and a control unit. The control unit executes: a switching instruction process in which, when determining that the electric storage device will reach an overcharge state or has reached an overcharge state on the basis of the voltage detected by the voltage detection unit, the control unit issues an interruption switching instruction for switching to the interruption state to the current interrupt device; and an interruption maintaining process in which, when the number of times of the switching instruction process exceeds a predetermined value in a predetermined period of time, the control unit determines that the energy storage device is misused, and issues an instruction to maintain the interruption state to the current interrupt device.

A method according to another aspect of the present invention for determining misuse of an energy storage device in an energy storage apparatus includes executing: a switching instruction process in which an interruption switching instruction for switching to the interruption state is issued to the current interrupt device, when it is determined that the energy storage device will reach an overcharge state or has reached an overcharge state on the basis of the voltage detected by the voltage detection unit; and a determination process in which, when the number of times of the switching instruction process exceeds a predetermined value in a predetermined period of time, it is determined that the energy storage device is misused.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
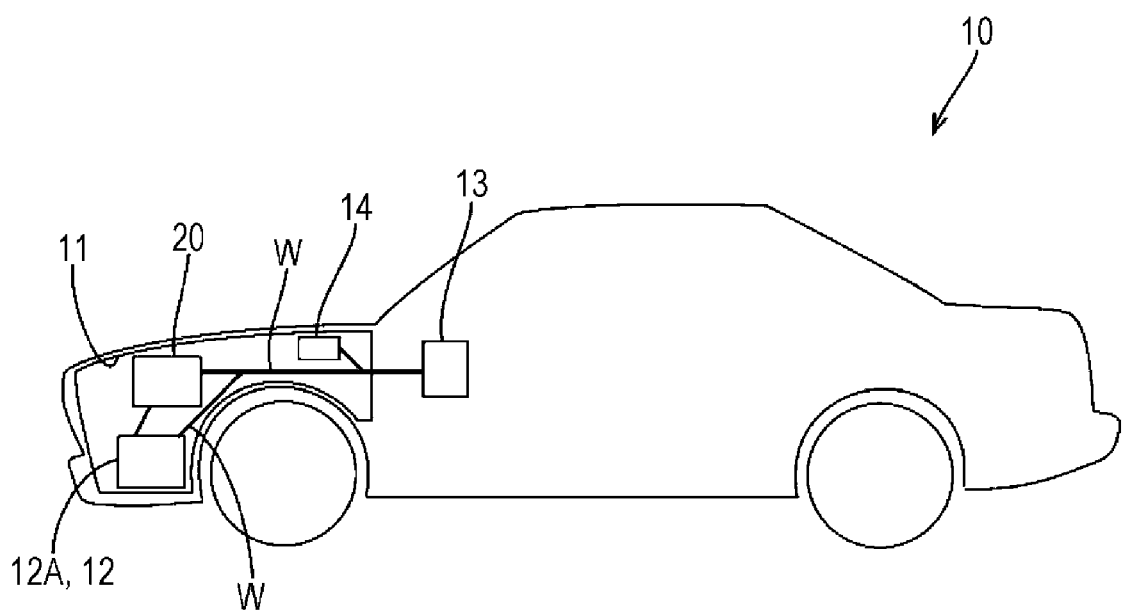
FIG. 1 is a partially cutout sectional view of a vehicle according to a first embodiment.

An energy storage apparatus according to an aspect of the present invention is mounted to a vehicle, and includes: an energy storage device connected to a vehicle load and a vehicle power generator which are mounted on the vehicle; a current interrupt device that causes the energy storage device and the vehicle load as well as the energy storage device and the vehicle power generator to be in a conduction state or in an interruption state; a voltage detection unit that detects voltage of the energy storage device; and a control unit. The control unit executes: a switching instruction process in which, when determining that the electric storage device will reach an overcharge state or has reached an overcharge state on the basis of the voltage detected by the voltage detection unit, the control unit issues an interruption switching instruction for switching to the interruption state to the current interrupt device; and an interruption maintaining process in which, when the number of times of the switching instruction process exceeds a predetermined value in a predetermined period of time, the control unit determines that the energy storage device is misused, and issues an instruction to maintain the interruption state to the current interrupt device.

According to this configuration, the occurrence of troubles on the energy storage device in the energy storage apparatus mounted to the vehicle can be prevented.

Outline of Present Embodiment

Firstly, the outline of the energy storage apparatus and the method for determining misuse of an energy storage device disclosed in the present embodiment will be described.

According to an aspect of the present invention, there is provided an energy storage apparatus mounted to a vehicle, the energy storage apparatus including: an energy storage device connected to a vehicle load and a vehicle power generator which are mounted on the vehicle; a current interrupt device that causes the energy storage device and the vehicle load as well as the energy storage device and the vehicle power generator to be in a conduction state or in an interruption state; a voltage detection unit that detects voltage of the energy storage device; and a control unit, in which the control unit executes: a switching instruction process in which, when determining that the electric storage device will reach an overcharge state or has reached an overcharge state on the basis of the voltage detected by the voltage detection unit, the control unit issues an interruption switching instruction for switching to the interruption state to the current interrupt device; and an interruption maintaining process in which, when the number of times of the switching instruction process exceeds a predetermined value in a predetermined period of time, the control unit determines that the energy storage device is misused, and issues an instruction to maintain the interruption state to the current interrupt device. The vehicle includes a manned vehicle and an unmanned vehicle (for example, automated guided vehicle (AGV)). The vehicle also includes a four-wheel vehicle, a three-wheel vehicle, a two-wheel vehicle, and the like. Specifically, the vehicle includes a car, a motorcycle, a cart, a forklift, and the like.

According to another aspect of the present invention, there is provided a method for determining misuse of an energy storage device in an energy storage apparatus which includes: an energy storage device connected to a vehicle load and a vehicle power generator which are mounted on the vehicle; a current interrupt device that causes current between the energy storage device and the vehicle load as well as current between the energy storage device and the vehicle power generator to be in a conduction state or in an interruption state; and a voltage detection unit that detects voltage of the energy storage device, the method including executing: a switching instruction process in which an interruption switching instruction for switching to the interruption state is issued to the current interrupt device, when it is determined that the energy storage device will reach an overcharge state on the basis of the voltage detected by the voltage detection unit; and a determination process in which, when the number of times of the switching instruction process exceeds a predetermined value in a predetermined period of time, it is determined that the energy storage device is misused.

According to this configuration, when the number of times of the switching instruction process exceeds a predetermined value in a predetermined period of time, it is determined that the energy storage device is misused, and the use of the energy storage device is prohibited. Thus, the occurrence of troubles on the energy storage device can be prevented.

The energy storage apparatus disclosed in the present specification may have the configuration described below.

As one aspect of the energy storage apparatus disclosed in the present specification, the energy storage apparatus may include a discharge circuit which is connected in parallel with the current interrupt device and has a diode that allows current to flow toward the vehicle load from the energy storage device.

According to this configuration, when the current interrupt device is in an interruption state, only discharging can be continued to the vehicle load from the energy storage device through the discharge circuit, whereby the vehicle load can continuously be driven while the energy storage device is prevented from reaching an overcharge state.

As one aspect of the energy storage apparatus disclosed in the present specification, the discharge circuit may include an auxiliary current interrupt device connected in series with the diode, and the control unit may execute both the interruption maintaining process and an auxiliary interruption maintaining process in which an instruction to maintain the interruption state is issued to the auxiliary current interrupt device, when determining that the energy storage device is misused because the number of times of the switching instruction process exceeds a predetermined value in a predetermined period of time, and determining that the vehicle reaches a parked state.

For example, when the interruption state is maintained only by the current interrupt device in the case where the energy storage device is determined to be misused, high current may flow through the diode due to cranking of a starter motor for starting an engine upon the next engine start-up, by which the diode may generate heat and may be broken.

However, according to this configuration, when the energy storage device is determined to be misused and the vehicle is determined to reach a parked state, both the current interrupt device and the auxiliary current interrupt device are maintained to the interruption state to interrupt the current between the vehicle load and the energy storage device, and the use of the energy storage device is prohibited. Therefore, this configuration can prevent the occurrence of troubles on the energy storage device, while preventing high current from flowing through the diode after that.

As one aspect of the energy storage apparatus disclosed in the present specification, the discharge circuit may include an auxiliary current interrupt device connected in series with the diode, and the control unit may execute the interruption maintaining process when determining that the energy storage device is misused because the number of times of the switching instruction process exceeds a predetermined value in a predetermined period of time, and execute an auxiliary interruption maintaining process in which an instruction to maintain the interruption state is issued to the auxiliary current interrupt device when determining that the vehicle reaches a parked state.

According to this configuration, when it is determined that the energy storage device is misused, the current interrupt device is switched to the interruption state to prevent the energy storage device from being overcharged, and after it is determined that the vehicle is in a parked state, the current between the vehicle load and the energy storage device is completely interrupted and the use of the energy storage device is prohibited. According to this stepwise current interruption, the energy storage device can be protected, while the safety of the vehicle can be ensured.

As one aspect of the energy storage apparatus disclosed in the present specification, the energy storage apparatus may include a current detection unit that detects current between the vehicle load and the energy storage device, and the control unit may determine that the vehicle reaches a parked state when determining that the current detected by the current detection unit has been continuously less than a predetermined value for a predetermined period of time.

According to this configuration, it can be determined that the vehicle reaches a parked state on the basis of the current detected by the current detection unit, and the auxiliary current interrupt device can be switched to the interruption state.

As one aspect of the energy storage apparatus disclosed in the present specification, the control unit may be communicable with a vehicle-side electronic control device provided to the vehicle, and may determine that the vehicle reaches a parked state on the basis of whether or not there is communication with the vehicle-side electronic control device.

According to this configuration, when the communication with the vehicle-side electronic control device is stopped and there is no communication for a predetermined period of time, for example, it is determined that the vehicle reaches the parked state, and the auxiliary current interrupt device can be switched to the interruption state.

As one aspect of the energy storage apparatus disclosed in the present specification, the control unit may be connectable to an external device, and the interruption state of the current interrupt device and the auxiliary current interrupt device may be canceled on the basis of the communication from the connected external device.

According to this configuration, the energy storage apparatus which is prohibited due to misuse can be removed from the vehicle, and the use prohibition state can be canceled by the external device. Thus, the energy storage device can be reused.

As one aspect of the energy storage apparatus disclosed in the present specification, the energy storage device may be a lithium ion secondary battery.

In general, a charge voltage range of a vehicle having mounted thereto a lead-acid battery to the lead-acid battery is higher than charge voltage of a lithium ion battery, and therefore, if the lithium ion battery is charged similarly to the lead-acid battery, the lithium ion battery may be overcharged. On the other hand, according to the configuration described above, the secondary battery is determined to be misused, and the use of the secondary battery is prohibited. Thus, this configuration is significantly effective for the case where a lithium ion secondary battery is mounted, by mistake, to a lead-acid battery vehicle.

First Embodiment

A first embodiment, in which the technique disclosed in the present specification is applied to a vehicle 10 such as an automobile, will be described with reference to FIGS. 1 to 8.

An energy storage device is not particularly limited so long as it is an energy storage device which can be charged. The energy storage device may be a secondary battery or a capacitor. If a secondary battery is used as the energy storage device, an energy storage apparatus according to the present embodiment is a battery apparatus. A battery apparatus using a secondary battery as the energy storage device will be described.

As illustrated in FIG. 1, the vehicle 10 includes: a vehicle load 12, such as electric components and a starter motor for starting an engine, installed in an engine room 11; a battery apparatus 20 connected to the vehicle load 12; a vehicle power generator 14, such as an alternator, connected to the vehicle load 12 and the battery apparatus 20; and a vehicle-side electronic control unit (hereinafter referred to as "vehicle ECU") 13 that controls the operation of the vehicle load 12.

The vehicle load 12 is activated by power supply from the battery apparatus 20 and the vehicle power generator 14. When the supply amount of power from the vehicle power generator 14 is small, the vehicle load 12 receives power supply from the battery apparatus 20 for activation.

The vehicle power generator 14 rotates with the drive of the engine in the vehicle 10 to generate power, and supplies the generated power to the vehicle load 12 and the battery apparatus 20.

Figure 4:
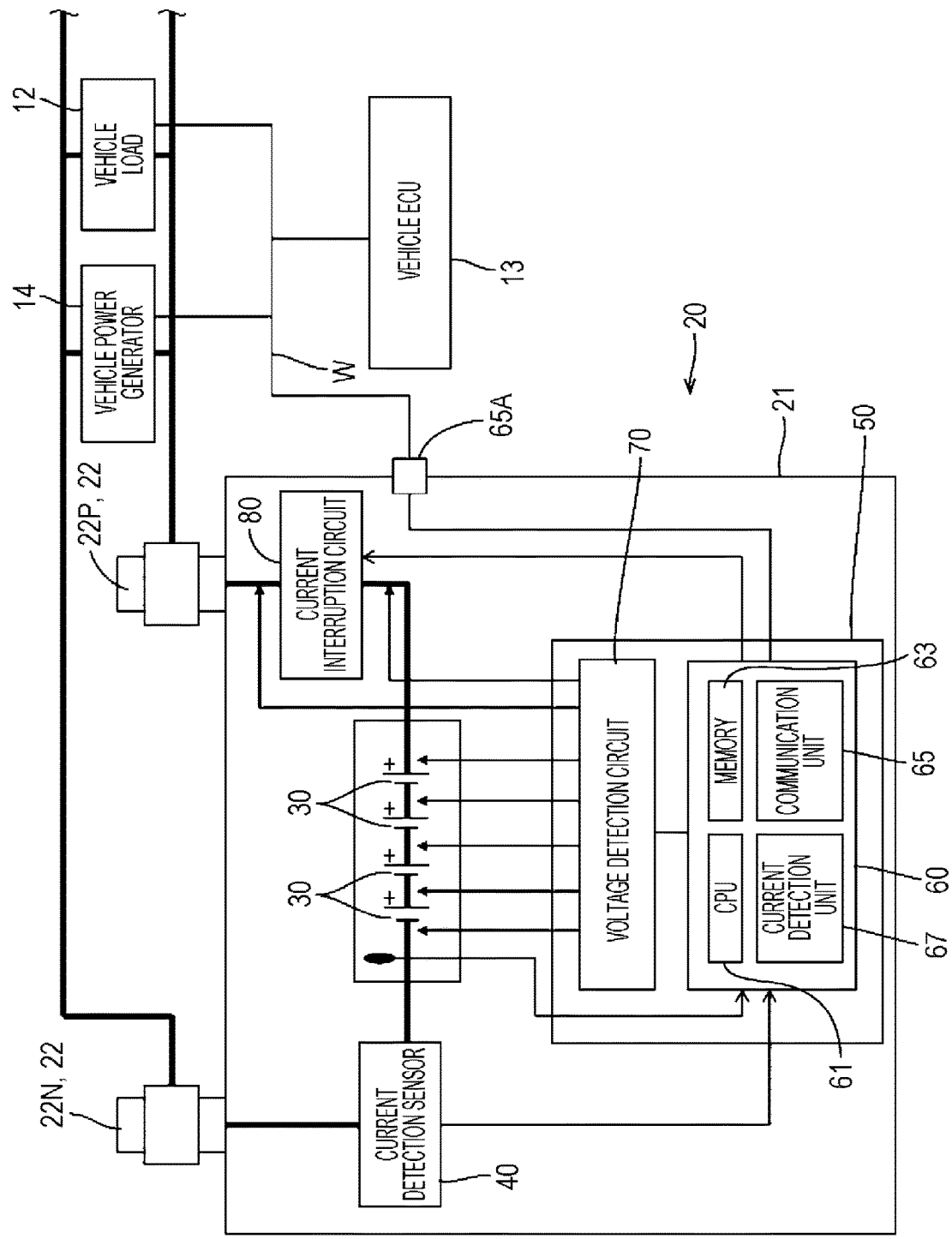
FIG. 4 is a block diagram of the energy storage apparatus.

As illustrated in FIGS. 1 and 4, the vehicle ECU 13 is communicably connected to the vehicle load 12, the vehicle power generator 14, the battery apparatus 20, and the like through communication lines W so as to control the operation of the engine and the vehicle load 12 on the basis of the state of the vehicle 10 or the state of the battery apparatus 20. Note that FIG. 1 does not illustrate all of the communication lines W for easy understanding of the drawing.

Figure 2:
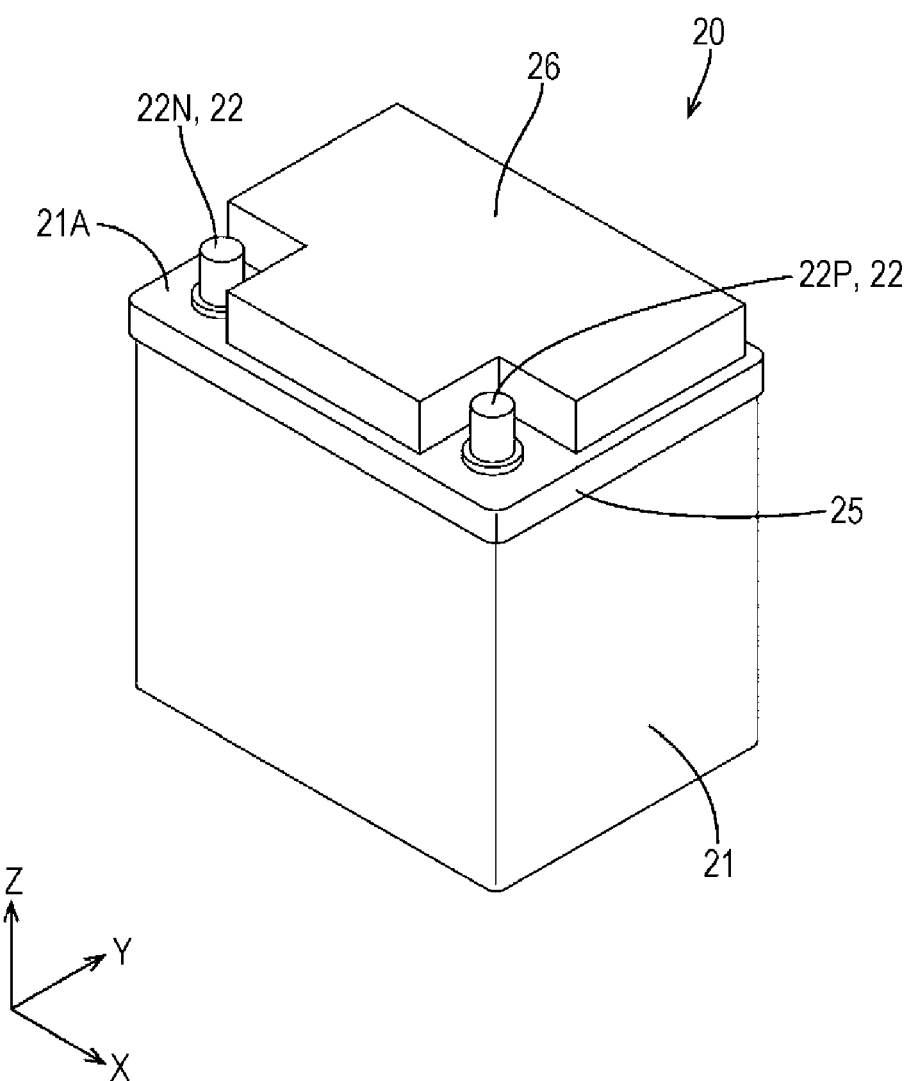
FIG. 2 is a perspective view of an energy storage apparatus.
Figure 3:
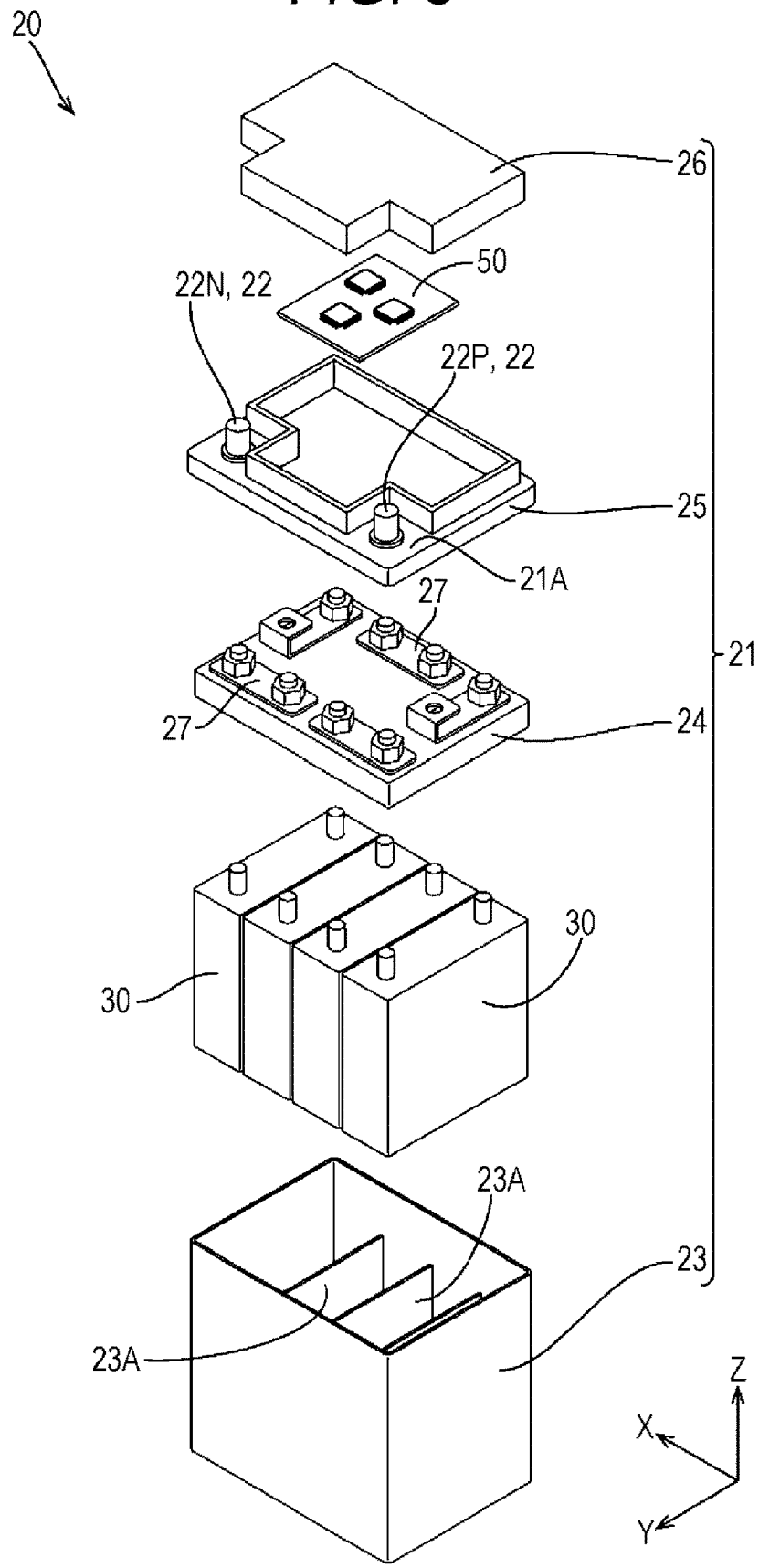
FIG. 3 is an exploded perspective view of the energy storage apparatus.

As illustrated in FIG. 2, the battery apparatus 20 has a block-shaped battery case 21. As illustrated in FIGS. 3 and 4, a plurality of secondary batteries 30 which are connected in series, a battery monitoring unit (hereinafter referred to as "BMU") 50 that monitors the secondary batteries 30, a current sensor 40 that detects current flowing through the secondary batteries 30, a current interruption circuit 80, and the like are stored in the battery case 21.

Note that, in FIG. 3, the current sensor 40 and the current interruption circuit 80 are not illustrated and the internal structure is simplified for easy understanding of the structure of the battery case 21. In addition, it will be described below such that, when FIGS. 2 and 3 are referred to, the up-down direction of the battery case 21 is defined as a Z direction, the direction along the long side of the battery case 21 is defined as an X direction, and the direction along the depth of the battery case 21 is defined as a Y direction, in the state in which the battery case 21 is placed without having any tilt with respect to the installment plane.

The battery case 21 is made of a synthetic resin. An upper wall 21A of the battery case 21 has substantially a rectangular shape in a plan view with a height difference in the Y direction as illustrated in FIGS. 2 and 3. A pair of terminal portions 22 to which unillustrated harness terminals are connected is provided on both ends in the X direction of a lower part of the upper wall 21A so as to be embedded into the upper wall 21A. The pair of terminal portions 22 is made of a metal such as a lead alloy, for example, and one of the pair of terminal portions 22 is a positive electrode terminal 22P, and the other is a negative electrode terminal 22N.

As illustrated in FIG. 3, the battery case 21 includes a box-shaped case body 23 open at the top, a positioning member 24 for positioning the secondary batteries 30, an inner lid 25 attached to the top of the case body 23, and an upper lid 26 attached to the top of the inner lid 25.

As illustrated in FIG. 3, a plurality of cell chambers 23A for individually storing the secondary batteries 30 are arranged in the X direction in the case body 23.

As illustrated in FIG. 3, the positioning member 24 includes a plurality of bus bars 27 disposed on the upper surface thereof. Because of the positioning member 24 disposed above the secondary batteries 30 in the case body 23, the secondary batteries 30 are positioned and connected in series by the bus bars 27.

As illustrated in FIG. 3, the inner lid 25 is able to store the BMU 50 thereinside. When the inner lid 25 is mounted to the case body 23, the secondary batteries 30 and the BMU 50 are connected to each other.

The secondary batteries 30 are lithium ion batteries using negative active materials of graphite materials and positive active materials of iron phosphates such as $LiFePO_4$, for example. As illustrated in FIG. 4, the secondary batteries 30 are connected in series with the current sensor 40 and the current interruption circuit 80 such that the current sensor 40 is located on the side of the negative electrode and the current interruption circuit 80 is located on the side of the positive electrode. Since the current sensor 40 is connected to the negative electrode terminal 22N and the current interruption circuit 80 is connected to the positive electrode terminal 22P, the secondary batteries 30 connected in series are connected to the pair of terminal portions 22 through the current sensor 40 and the current interruption circuit 80.

As illustrated in FIG. 4, the BMU 50 is connected so as to be able to receive power from the secondary batteries 30, and includes a control unit 60 and a voltage detection circuit (one example of a "voltage detection unit") 70.

The voltage detection circuit 70 is connected to both ends of the current interruption circuit 80 and both ends of each of the secondary batteries 30 through voltage detection lines, and detects an individual voltage V1 of each of the secondary batteries 30 and a total voltage V2 of the secondary batteries 30 connected in series, in response to an instruction from the control unit 60.

The control unit 60 includes a central processing unit (hereinafter referred to as a "CPU") 61, a memory 63, a communication unit 65, and a current detection unit 67. The current detection unit 67 detects current flowing through the secondary batteries 30 through the current sensor 40.

The memory 63 stores: various programs including a control program for controlling the operation of the BMU 50, a protection process program for monitoring the secondary batteries 30, and a misuse determination program for prohibiting the use of the secondary batteries 30; and data necessary for the execution of the various programs, such as individual and total overdischarge voltage thresholds of the secondary batteries 30, individual and total overcharge voltage thresholds of the secondary batteries 30, the maximum number of times of a switching instruction process (hereinafter referred to as a "switching maximum value") in which an interruption switching instruction is transmitted per a predetermined time to a current interrupt device 81, and the lower limit of consumption current of the vehicle 10. The memory 63 also stores voltages and currents detected by the control unit 60 and the voltage detection circuit 70.

The communication unit 65 is connected to the vehicle ECU 13 through a connector 65A so as to be communicable by LIN communication or the like. Specifically, the communication unit 65 transmits a command issued from the vehicle ECU 13 to the control unit 60 from the vehicle ECU 13, and transmits a signal in response to the request of the vehicle ECU 13 to the vehicle ECU 13 from the control unit 60.

The CPU 61 controls the units in the battery apparatus 20 to protect the secondary batteries 30 on the basis of the voltage and current detected by the voltage detection circuit 70 and the current detection unit 67 and the various programs and data read from the memory 63.

Figure 5:
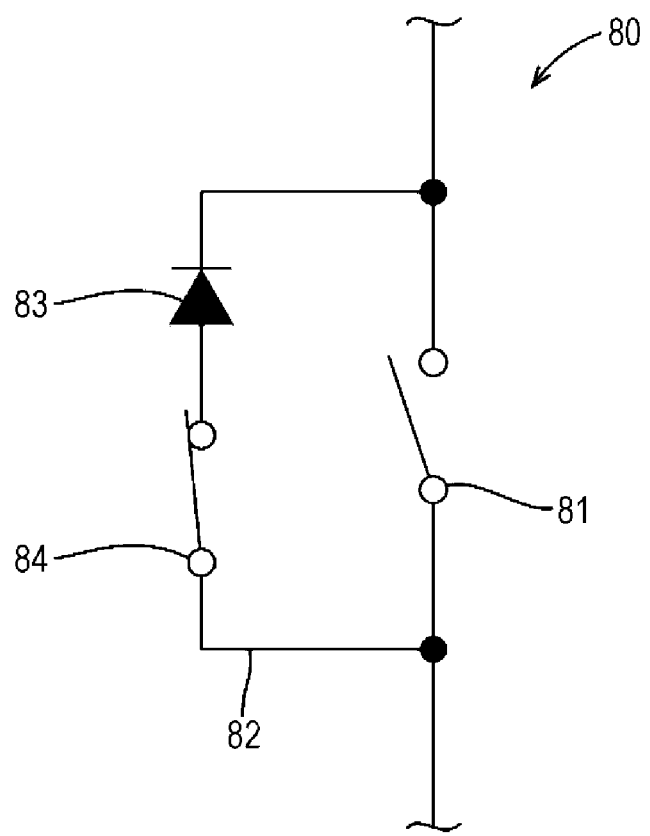
FIG. 5 is a diagram illustrating a current interruption circuit.

As illustrated in FIG. 5, the current interruption circuit 80 includes the current interrupt device 81 and a discharge circuit 82 connected in parallel with the current interrupt device 81.

The current interrupt device 81 is a contact relay (mechanical switch), for example, and is disposed between the secondary batteries 30 and the positive electrode terminal 22P in such a way that one end thereof is connected to the secondary batteries 30 and the other end thereof is connected to the positive electrode terminal 22P. The current interrupt device 81 is activated in response to the instruction from the CPU 61 in the BMU 50 so as to cause the secondary batteries 30 and the positive electrode terminal 22P to be in a conduction state or in an interruption state. Although the current interrupt device 81 is a contact relay in the present embodiment, it may be a semiconductor switch such as an FET.

The discharge circuit 82 includes a diode 83 and an auxiliary current interrupt device 84 connected in series with the diode 83.

The diode 83 is disposed such that the direction of current flowing toward the positive electrode terminal 22P from the secondary batteries 30, that is, toward the vehicle load 12 from the secondary batteries 30, is the forward direction. In other words, when the current interrupt device 81 is in the interruption state, current in the forward direction flows through the diode 83.

The auxiliary current interrupt device 84 is a contact relay (mechanical switch), for example, and is disposed between the secondary batteries 30 and the diode 83 in such a way that one end thereof is connected to the secondary batteries 30 and the other end thereof is connected to the diode 83. The auxiliary current interrupt device 84 is activated in response to the instruction from the CPU 61 in the BMU 50 so as to cause the secondary batteries 30 and the diode 83 to be in a conduction state or in an interruption state.

Figure 8:
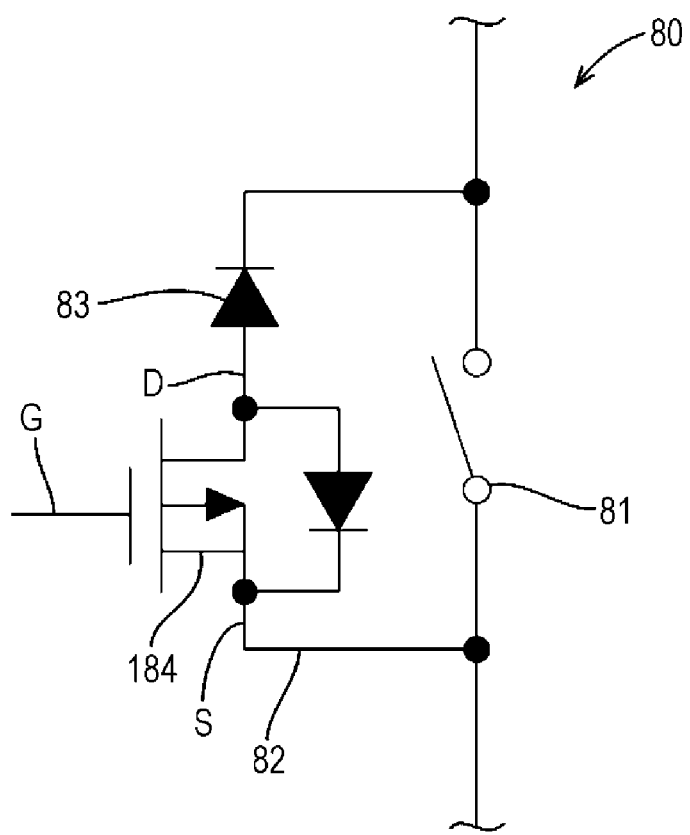
FIG. 8 is a diagram illustrating a modification of the current interruption circuit.

Although the auxiliary current interrupt device 84 is a contact relay in the configuration described above, an FET switch may be used for an auxiliary current interrupt device 184 as illustrated in FIG. 8. In this case, the FET switch is a P-channel MOSFET, for example, and the FET switch is disposed such that a source S is connected to the second batteries 30, a gate G is connected to the BMU 50, and a drain D is connected to the diode 83, respectively.

Specifically, when the current interrupt device 81 and the auxiliary current interrupt device 84 are in the conduction state, power can be supplied to the vehicle load 12 in the vehicle 10 from the secondary batteries 30 (the secondary batteries 30 can be discharged) and the secondary batteries 30 can be charged by the vehicle power generator 14 through the current interrupt device 81. When the current interrupt device 81 is in the interruption state with the auxiliary current interrupt device 84 being still in the conduction state, power supply from the secondary batteries 30 to the vehicle load 12 is enabled through the discharge circuit (auxiliary current interrupt device 84 and the diode 83) 82, but the charging of the secondary batteries 30 by the vehicle power generator 14 is inhibited by the diode 83. When both the current interrupt device 81 and the auxiliary current interrupt device 84 are then brought into the interruption state, the secondary batteries 30 are completely isolated from the vehicle load 12 and the vehicle power generator 14, so that the power supply from the secondary batteries 30 to the vehicle load 12 (the discharging of the secondary batteries 30) is also impossible.

The CPU 61 executes the battery protection process for issuing an interruption switching instruction to the current interrupt device 81 on the basis of the voltage and current detected by the voltage detection circuit 70 and the current detection unit 67 and the protection process program stored in the memory 63. The CPU 61 also executes the process for prohibiting the use of the secondary batteries 30 on the basis of the misuse determination program, and the like, in order to protect the secondary batteries 30.

Figure 6:
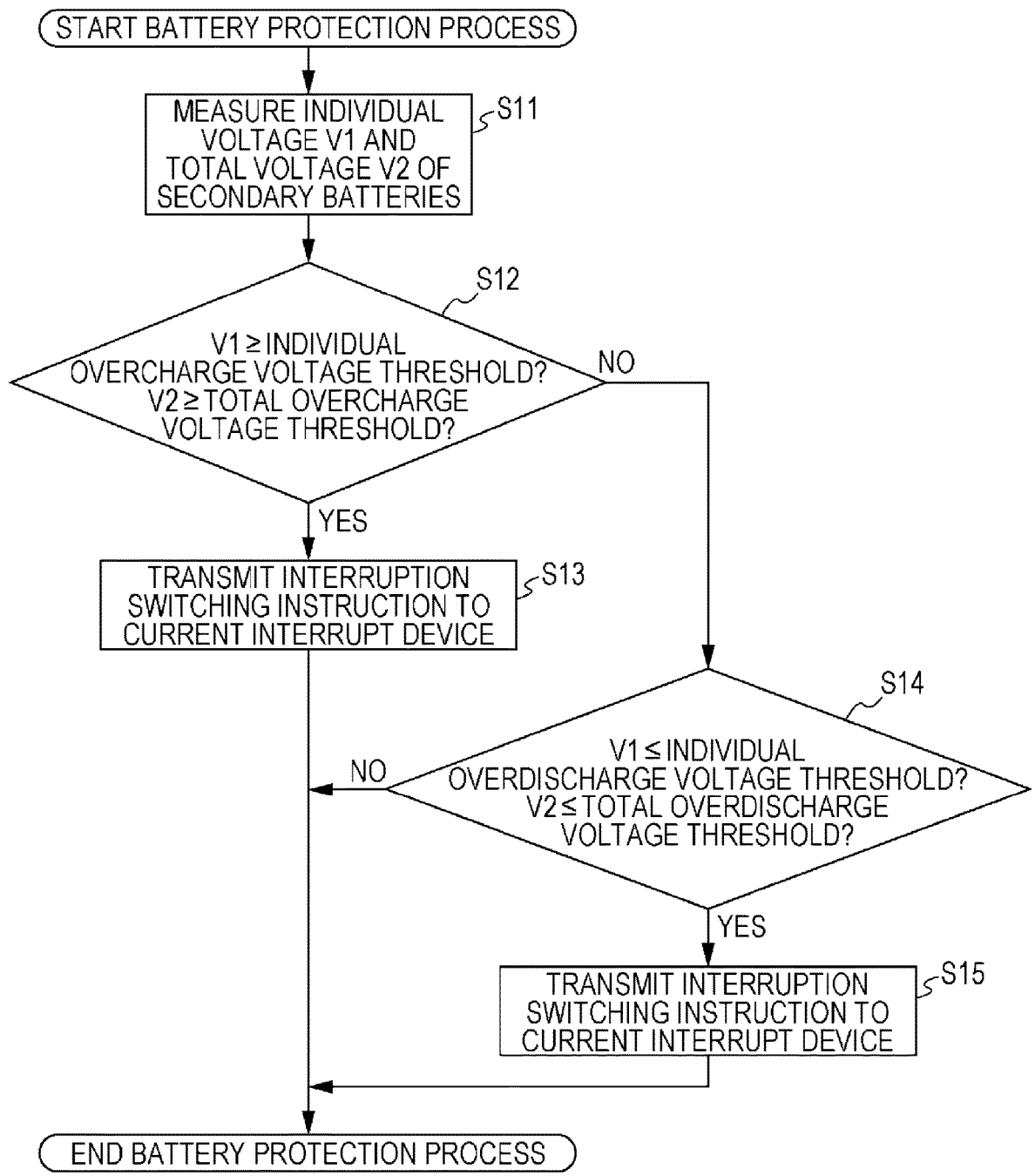
FIG. 6 is a flowchart of a battery protection process.

The battery protection process will be described below with reference to FIG. 6.

In the battery protection process, the CPU 61 detects the individual voltage V1 of each of the secondary batteries 30 and the total voltage V2 of the secondary batteries 30 connected in series by the voltage detection circuit 70 (S11), and compares the individual voltage V1 and the total voltage V2 to the individual overcharge voltage threshold and the total overcharge voltage threshold stored in the memory 63 (S12).

The individual overcharge voltage threshold in the present embodiment is a value slightly smaller than the voltage value when one of the secondary batteries 30 is in the overcharge state, and the total overcharge voltage threshold is a value slightly smaller than the voltage value when the secondary batteries 30 connected in series are in the overcharge state. However, the individual overcharge voltage threshold may be set to the voltage value when one of the secondary batteries 30 is in the overcharge state, and the total overcharge voltage threshold may be set to the voltage value when the secondary batteries 30 connected in series are in the overcharge state, for example.

When determining that the individual voltage V1 of any one of the secondary batteries 30 is equal to or larger than the individual overcharge voltage threshold, or that the total voltage V2 is equal to or larger than the total overcharge voltage threshold (S12: YES), the CPU 61 determines that the secondary batteries 30 are likely to reach the overcharge state, and executes the switching instruction process in which the interruption switching instruction to switch the current interrupt device 81 to the interruption state is transmitted to the current interrupt device 81 (S13). According to this process, the current interrupt device 81 is switched to the interruption state to interrupt the current between the secondary batteries 30 and the vehicle power generator 14, which can prevent the secondary batteries 30 from reaching the overcharge state. Then, the battery protection process is ended.

When determining that all of the individual voltages V1 are smaller than the individual overcharge voltage threshold and the total voltage V2 is smaller than the total overcharge voltage threshold (S12: NO), the CPU 61 compares each individual voltage V1 and the total voltage V2 to the individual overdischarge voltage threshold and the total overdischarge voltage threshold stored in the memory 63 (S14).

The individual overdischarge voltage threshold is a value slightly larger than the voltage value when one of the secondary batteries 30 is in the overdischarge state, and the total overdischarge voltage threshold is a value slightly larger than the voltage value when the secondary batteries 30 connected in series are in the overdischarge state.

When determining that all of the individual voltages V1 are smaller than the individual overcharge voltage threshold and the total voltage V2 is smaller than the total overcharge voltage threshold, as well as all of the individual voltages V1 are equal to or larger than the individual overdischarge voltage threshold and the total voltage V2 is equal to or larger than the total overdischarge voltage threshold (S12: NO and S14: NO), the CPU 61 ends the battery protection process.

When determining that the individual voltage V1 of any one of the secondary batteries 30 is smaller than the individual overcharge voltage threshold and the total voltage V2 is smaller than the total overcharge voltage threshold, and determining that the individual voltage V1 of any one of the secondary batteries 30 is smaller than the individual overdischarge voltage threshold or the total voltage V2 is smaller than the total overdischarge voltage threshold (S12: NO and S14: YES), the CPU 61 determines that the secondary batteries 30 are likely to reach the overdischarge state. Then CPU 61 executes the switching instruction process for transmitting the interruption switching instruction to both the current interrupt device 81 and the auxiliary current interrupt device 84 (S15). Thus, the current interrupt device 81 and the auxiliary current interrupt device 84 are switched to the interruption state, and then, the battery protection process is ended.

When the possibility that the secondary batteries 30 reach the overcharge state is eliminated, the CPU 61 transmits a conduction switching instruction to the current interrupt device 81. When the possibility that the secondary batteries 30 reach the overdischarge state is eliminated, the CPU 61 transmits a conduction switching instruction to the current interrupt device 81 and the auxiliary current interruption device 84 to switch both devices to the conduction state.

In this way, the battery protection process is always or periodically repeated to prevent the secondary batteries 30 from being in the overcharge state or the overdischarge state.

Figure 7:
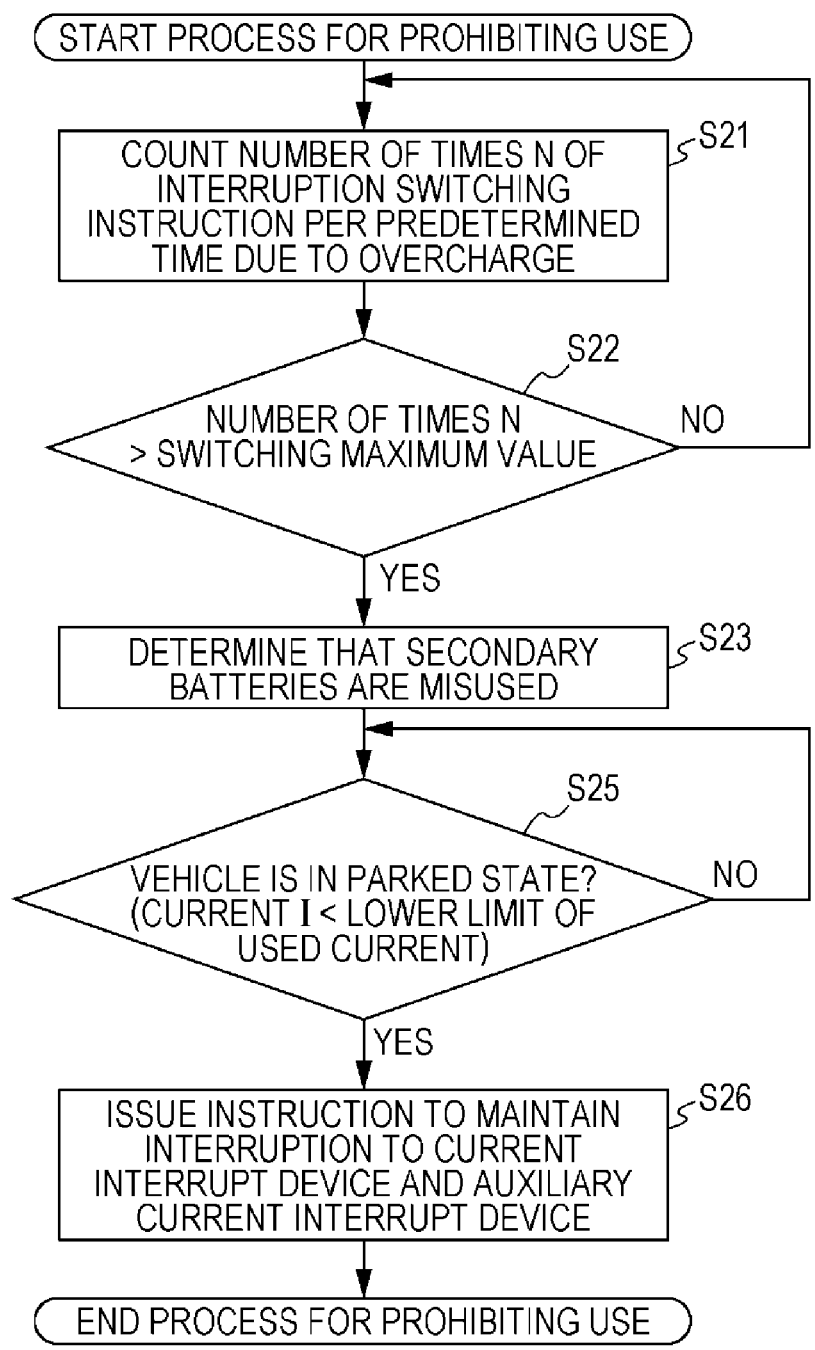
FIG. 7 is a flowchart of a process for prohibiting use.

Next, the process for prohibiting use of the secondary batteries 30 will be described with reference to FIG. 7. Although not described in detail, the detection of voltage of the secondary batteries 30 by the voltage detection circuit 70 and the detection of current by the current detection unit 67 are always or periodically performed in the description below.

In the process for prohibiting use, the CPU 61 firstly executes a determination process for counting the number of times N of the switching instruction process in which the interruption switching instruction is transmitted to the current interrupt device 81 due to overcharge, in a predetermined time (S21). Secondary, the CPU 61, for determining whether or not the secondary batteries 30 are misused, compares the counted number of times N and the switching maximum value stored in the memory 63 (S22).

When the number of times N of the switching instruction process does not exceed the switching maximum value (S22: NO), the CPU 61 determines that the secondary batteries 30 are properly used, and keeps on monitoring whether or not the number of times N of the switching instruction process due to overcharge exceeds the switching maximum value.

When the number of times N of the switching instruction process due to overcharge exceeds the switching maximum value (S22: YES), the CPU 61 determines that the secondary batteries 30 are misused (S23), and then, determines whether or not the vehicle 10 is in a parked state. Note that the parked state means that "there is no movement of the vehicle 10 for a predetermined period of time".

More specifically, the CPU 61 determines whether or not the vehicle 10 is in a parked state by determining whether or not the current I of the secondary batteries 30 detected by the current detection unit 67 has continuously been less than a lower limit of consumption current stored in the memory 63 for a predetermined period of time (S25). In the present embodiment, the CPU 61 determines whether or not the vehicle 10 is in a parked state by determining whether or not the current I has been continuously less than the lower limit of the consumption current for a predetermined period of time. However, the CPU 61 may determine whether or not the vehicle is in a parked state by determining whether or not the current detected by the current detection unit has been continuously equal to or lower than the lower limit of the consumption current for a predetermined period of time.

In the case where the current I is equal to or higher than the lower limit of the consumption current (S25: NO), the CPU 61 determines that the vehicle 10 is not in the parked state, and keeps on monitoring whether or not the current I has been continuously less than the lower limit of the consumption current for a predetermined period of time.

When the current I has been continuously less than the lower limit of the consumption current for a predetermined period of time (S25: YES), the CPU 61 determines that the vehicle 10 is in the parked state. Then, the CPU 61 executes an interruption maintaining process in which an interruption maintaining instruction for maintaining the interruption state is transmitted to the current interrupt device 81, and an auxiliary interruption maintaining process in which an auxiliary interruption maintaining instruction for maintaining the interruption state is transmitted to the auxiliary current interrupt device 84 (S26). Then, when the current interrupt device 81 and the auxiliary current interrupt device 84 are switched to the interruption state, the CPU 61 ends the process for prohibiting use.

In the present embodiment, whether or not the vehicle 10 is in the parked state is determined on the basis of the current I of the secondary batteries 30 detected by the current detection unit 67. However, whether or not the vehicle 10 is in the parked state may be determined by detecting that there is no communication for a predetermined period of time due to the stopping of the communication with the vehicle ECU 13.

Specifically, according to the present embodiment, the misuse of the secondary batteries 30 can be determined by the determination process in which the number of times N of the switching instruction process for transmitting the interruption switching instruction to the current interrupt device 81 due to overcharge is counted, and the counted number of times N and the switching maximum value are compared.

In the process for prohibiting use, the number of times N of the switching instruction process is always counted to prevent the secondary batteries 30 from being misused.

Figure 9:
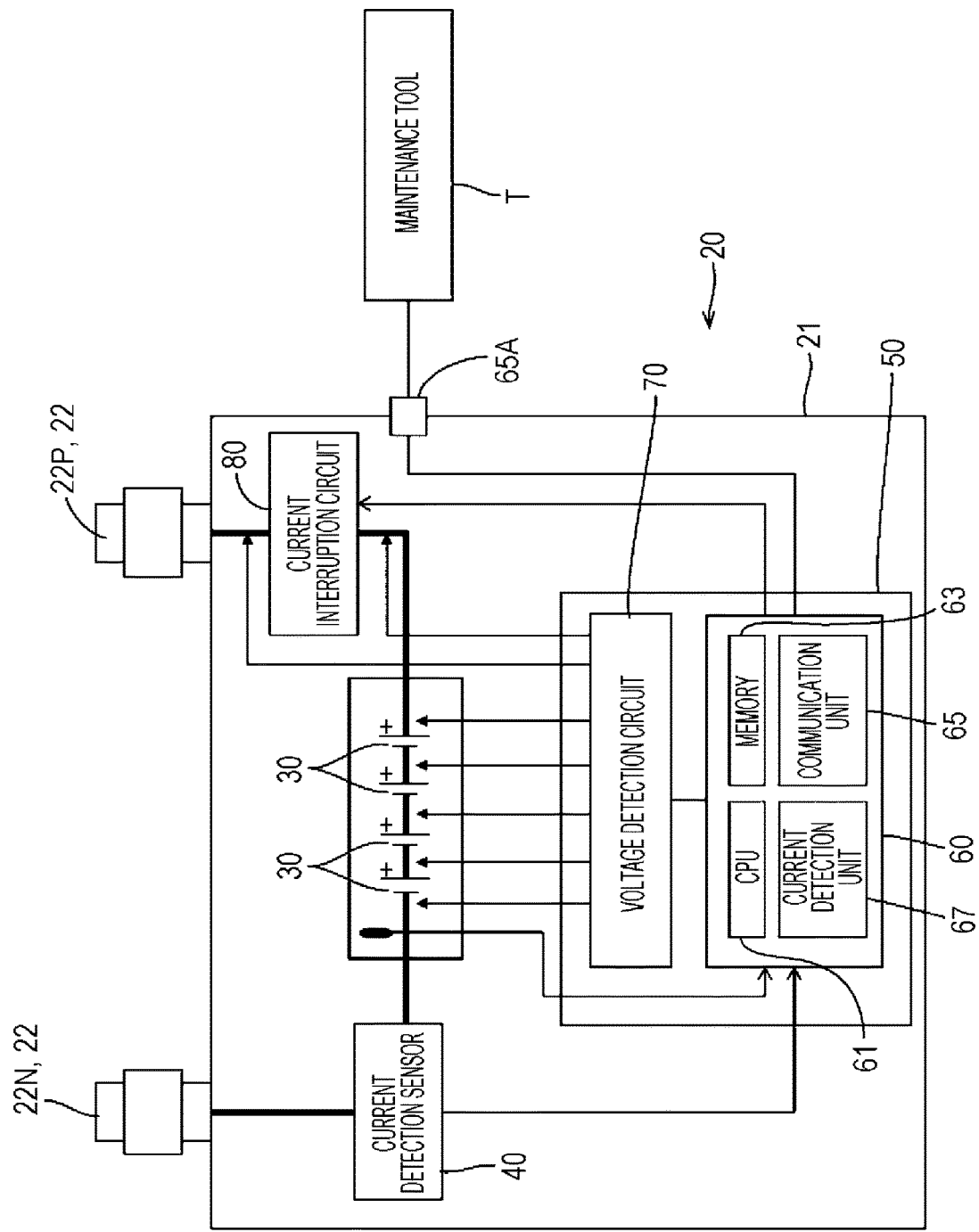
FIG. 9 is a diagram illustrating a state in which a maintenance tool is connected to the energy storage apparatus.

In addition, the battery device 20, the use of which is prohibited due to misuse, is removed from the vehicle 10, for example, and a dedicated maintenance tool (one example of an "external device") T is connected to the connector 65A to establish communication with the CPU 61 in the control unit 60 as illustrated in FIG. 9, whereby the use prohibition state can be canceled.

As described above, according to the present embodiment, when the battery device 20 is mounted to a vehicle which has mounted thereon a lead-acid battery having a charge voltage higher than that of the battery device 20, the CPU 61 determines that the overcharge state is established and frequently transmits the interruption switching instruction to the current interrupt device 81 in the battery protection process. Thus, the secondary batteries 30 are determined to be misused. Then, when it is determined that the vehicle 10 reaches the parked state on the basis of the state of the current I detected by the current detection unit 67 and it is all right to completely isolate the secondary batteries 30 from the vehicle load 12, the interruption state of the current interrupt device 81 and the auxiliary current interrupt device 84 is maintained.

Specifically, according to the present embodiment, the misuse by which the secondary batteries 30 are frequently in the overcharge state can be prohibited, whereby the trouble of the secondary batteries 30 caused by the overcharge can be prevented.

In addition, in the present embodiment, in the battery protection process, even if the current interrupt device 81 is in the interruption state, power can be supplied to the vehicle load 12 from the secondary batteries 30 through the discharge circuit 82, but the charging of the secondary batteries 30 by the vehicle power generator 14 is disabled. Therefore, this configuration can prevent the secondary batteries 30 from being in the overcharge state, while continuing the power supply to the vehicle load 12 from the secondary batteries 30, when the vehicle 10 travels. Then, when it is determined that the secondary batteries 30 are likely to reach the overcharge state and that the vehicle reaches a parked state, the current interrupt device 81 and the auxiliary current interrupt device 84 are both in the interruption state, whereby the misuse of the secondary batteries 30 can be prohibited.

In addition, when only the current interrupt device is maintained to the interruption state in the case where the secondary batteries are determined to be misused, high current may flow through the diode due to the cranking of the starter motor for starting the engine upon the next engine start-up, by which the diode may generate heat and may be broken.

However, according to the present embodiment, after the secondary batteries are determined to be misused and the vehicle 10 is determined to reach the parked state, both the current interrupt device 81 and the auxiliary current interrupt device 84 are maintained to the interruption state, the secondary batteries 30 and the vehicle load 12 are maintained to the state of being completely isolated from each other, and the use of the secondary batteries 30 is prohibited. Therefore, the flow of high current through the diode 83 after that can be prevented, which can prevent the diode from being broken due to the heat generation.

That is, in the case where there is a possibility that a battery device using a lithium ion battery is mounted to a vehicle having mounted thereto a lead-acid battery having a charge voltage higher than the charge voltage of the lithium ion battery, a secondary battery is determined to be misused, and the use of the secondary battery is prohibited. Thus, the determination of the misuse of the secondary battery in the present embodiment is extremely effective for this case.

Second Embodiment

Figure 10:
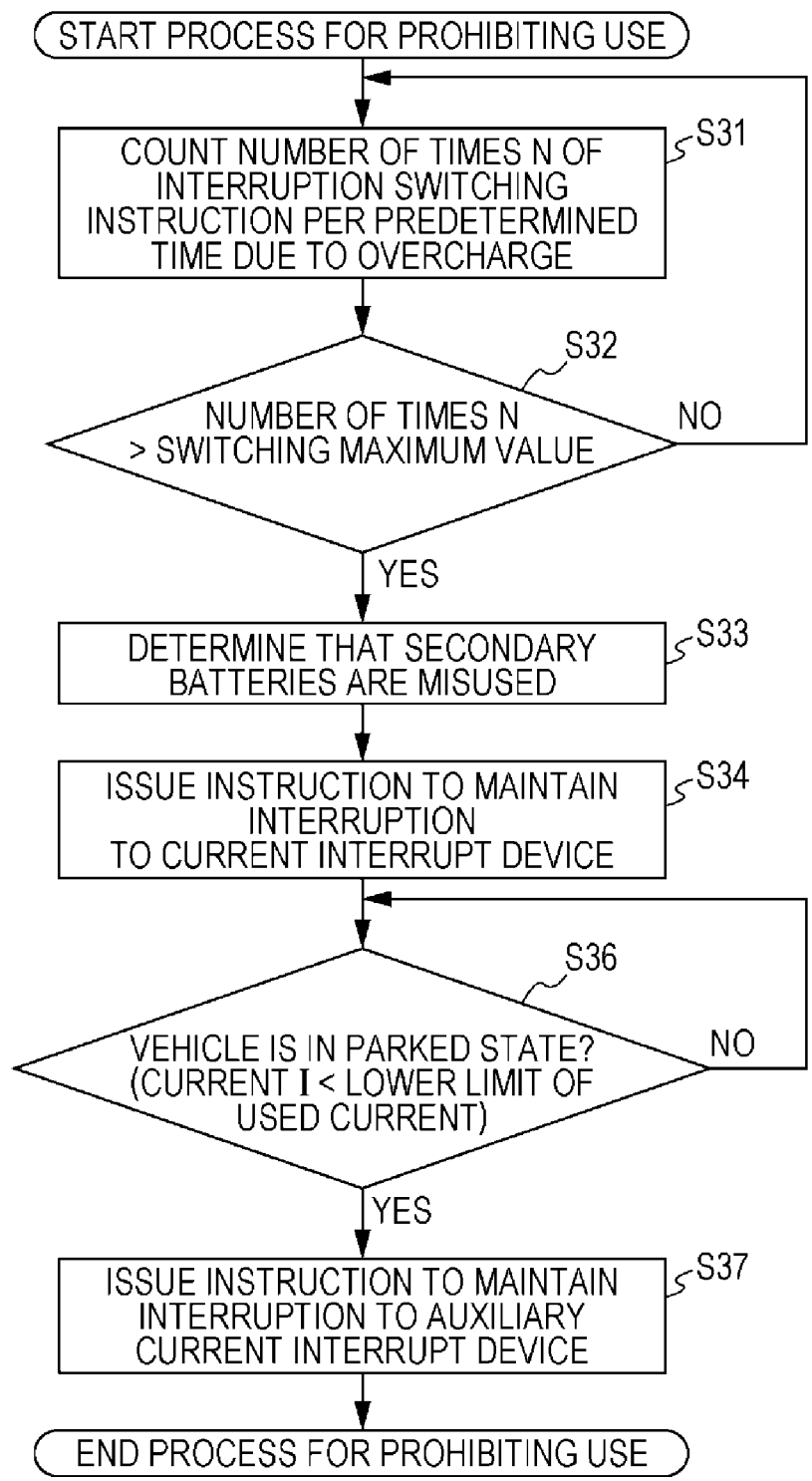
FIG. 10 is a flowchart of a process for prohibiting use according to a second embodiment.

Next, a second embodiment will be described with reference to FIG. 10.

In the second embodiment, the configuration for the process for prohibiting use in the first embodiment is modified, and the redundant description of the components, operation, and effects common to the first embodiment will be omitted. In addition, the configurations similar to those in the first embodiment are identified by the same reference numerals.

In the process for prohibiting use in the second embodiment, the period in which the current interrupt device 81 is brought into the interruption state and the period in which the auxiliary current interrupt device 84 is brought into the interruption state are independent.

Hereinafter, the process for prohibiting use of the secondary batteries 30 in the present embodiment will be described with reference to FIG. 10. Notably, as in the first embodiment, the detection of voltage of the secondary batteries 30 by the voltage detection circuit 70 and the detection of current by the current detection unit 67 are always or periodically performed in the description below.

In the process for prohibiting use in the second embodiment, the CPU 61 firstly executes a determination process for counting the number of times N of the switching instruction process in which the interruption switching instruction is transmitted to the current interrupt device 81 due to overcharge, in a predetermined time (S31), and for determining whether or not the secondary batteries 30 are misused by comparing the counted number of times N and the switching maximum value stored in the memory 63 (S32).

When the number of times N of the switching instruction process due to overcharge does not exceed the switching maximum value (S32: NO), the CPU 61 determines that the secondary batteries 30 are properly used, and keeps on monitoring whether or not the number of times N of the switching instruction process due to overcharge exceeds the switching maximum value.

When the number of times N of the switching instruction process due to overcharge exceeds the switching maximum value (S32: YES), the CPU 61 determines that the secondary batteries 30 are misused (S33), and then, executes an interruption maintaining process in which an interruption maintaining instruction for maintaining the interruption state is transmitted to the current interrupt device 81 (S34). Thus, the current interrupt device 81 is switched to the interruption state, so that power supply from the secondary batteries 30 to the vehicle load 12 is enabled through the discharge circuit (auxiliary current interrupt device 84 and the diode 83) 82, but the charging of the secondary batteries 30 by the vehicle power generator 14 is inhibited by the diode 83.

Then, the CPU 61 determines whether or not the vehicle 10 is in a parked state by determining whether or not the current I of the secondary batteries 30 detected by the current detection unit 67 has continuously been less than a lower limit of consumption current stored in the memory 63 for a predetermined period of time (S36). Note that the determination of the parked state may be performed on the basis of whether or not there is communication with the vehicle ECU 13 as in the first embodiment.

In the case where the current I is equal to or higher than the lower limit of the consumption current (S36: NO), the CPU 61 determines that the vehicle 10 is not in the parked state, and keeps on monitoring whether or not the current I has been continuously less than the lower limit of the consumption current for a predetermined period of time.

When the current I has been continuously less than the lower limit of the consumption current for a predetermined period of time (S36: YES), the CPU 61 determines that the vehicle 10 is in the parked state, and executes the auxiliary interruption maintaining process in which the auxiliary interruption maintaining instruction for maintaining the interruption state is transmitted to the auxiliary current interrupt device 84 (S37). Thus, the secondary batteries 30 are completely isolated from the vehicle load 12 and the vehicle power generator 14, so that the power supply to the vehicle load 12 from the secondary batteries 30 is disabled. Then, the process for prohibiting use is ended.

As described above, according to the present embodiment, when it is determined that the secondary batteries 30 are misused, the current interrupt device 81 is firstly switched to the interruption state, by which the discharging of the secondary batteries 30 is enabled through the discharge circuit 82, but the charging of the secondary batteries 30 is inhibited to prevent the secondary batteries 30 from being overcharged.

After it is determined that the vehicle 10 is in a parked state, the current between the secondary batteries 30 and the vehicle load 12 is completely interrupted, and the use of the secondary batteries 30 is prohibited. Thus, the secondary batteries 30 can be protected in a stepwise manner.

Other Embodiments

The technique disclosed in the present specification is not limited to the embodiments described above with reference to the accompanying drawings, and includes various other embodiments described below, for example.

(1) In the embodiments described above, the battery monitoring unit 50 is composed of one CPU 61. However, it is not limited thereto. The battery monitoring unit may include a plurality of CPUs, may be a hard circuit such as an ASIC (Application Specific Integrated Circuit), or may be a microcomputer, a FPGA, a MPU, or a combination thereof.

(2) In the embodiments described above, the communication system between the vehicle ECU 13 and the battery device 20 is LIN communication. However, it is not limited thereto. The communication system between the vehicle ECU and the battery device may be CAN communication or other communication system.

(3) In the embodiments described above, the discharge circuit 82 is provided in parallel with the current interrupt device 81 in the current interruption circuit 80. However, it is not limited thereto. The discharge circuit may not be provided in the current interruption circuit.

(4) In the embodiments described above, the number of times N of the switching instruction process in which the interruption switching instruction is transmitted to the current interrupt device 81 due to overcharge is counted in a predetermined period of time (S31), and it is determined whether or not the secondary batteries 30 are misused by comparing the counted number of times N and the switching maximum value stored in the memory 63. However, it is not limited thereto. It may be determined that the secondary batteries are misused by detecting that the secondary batteries are charged with a voltage higher than a predetermined charge voltage and the total voltage of the secondary batteries detected by the voltage detection circuit exceeds the total overcharge voltage threshold.

(5) In the embodiments described above, when the current I of the secondary batteries 30 has been continuously less than the lower limit of the consumption current for a predetermined period of time, it is determined that the vehicle 10 is in the parked state. However, it is not limited thereto. When the current I of the secondary batteries 30 has been continuously less than or not more than an upper limit of dark current of the vehicle, it may be determined that the vehicle is in the parked state.

What is claimed is:

1. An energy storage apparatus mounted to a vehicle, the energy storage apparatus comprising:
    an energy storage device which is able to be charged and connected to a vehicle load and a vehicle power generator which are mounted on the vehicle;
    a current interrupt device that causes the energy storage device and the vehicle load or the energy storage device and the vehicle power generator to be in one of:
        an interruption state in which charging of the energy storage device is inhibited; and a conduction state;

a voltage detection unit that detects voltage of the energy storage device; and a control unit, wherein the control unit executes:

a switching instruction process in which, when determining that the energy storage device will reach an overcharge state or has reached an overcharge state on the basis of the voltage detected by the voltage detection unit, the control unit issues an interruption switching instruction for switching to the interruption state to the current interrupt device; and an interruption maintaining process in which:

when the number of times that the control unit executes the switching instruction process exceeds a predetermined value in a predetermined period of time, the control unit determines that the energy storage device is misused; and when the vehicle is in a parked state, the control unit issues an instruction to maintain the interruption state to the current interrupt device.

2. The energy storage apparatus according to claim 1, comprising a discharge circuit which is connected in parallel with the current interrupt device and includes a diode that allows current to flow toward the vehicle load from the energy storage device.

3. The energy storage apparatus according to claim 2, wherein the discharge circuit includes an auxiliary current interrupt device connected in series with the diode, and the control unit executes both the interruption maintaining process and an auxiliary interruption maintaining process in which an instruction to maintain the interruption state is issued to the auxiliary current interrupt device, when determining that the energy storage device is misused because the number of times of the switching instruction process exceeds a predetermined value in a predetermined period of time.

4. The energy storage apparatus according to claim 3, further comprising a current detection unit that detects current between the vehicle load and the energy storage device, wherein the control unit determines that the vehicle reaches a parked state when determining that the current detected by the current detection unit has been continuously less than a predetermined value for a predetermined period of time.

5. The energy storage apparatus according to claim 3, wherein the control unit is communicable with a vehicle-side electronic control device provided to the vehicle, and determines that the vehicle reaches a parked state on the basis of whether or not there is communication with the vehicle-side electronic control device.

6. The energy storage apparatus according to claim 3, wherein the control unit is connectable to an external device, and cancels the interruption state of the current interrupt device and the auxiliary current interrupt device on the basis of the communication from the connected external device.

7. The energy storage apparatus according to claim 2, wherein the discharge circuit includes an auxiliary current interrupt device connected in series with the diode, and the control unit executes the interruption maintaining process when determining that the energy storage device is misused because the number of times of the switching instruction process exceeds a predetermined value in a predetermined period of time, and executes an auxiliary interruption maintaining process in which an instruction to maintain the interruption state is issued to the auxiliary current interrupt device, when determining that the vehicle reaches a parked state.

8. The energy storage apparatus according to claim 1, wherein the energy storage device is a lithium ion secondary battery.

9. The energy storage apparatus according to claim 1, further comprising:

a current sensor which detects current flowing through the energy storage device.

10. The energy storage apparatus according to claim 9, further comprising:

a current interrupt circuit including the current interrupt device and a discharge circuit connected in parallel with the current interrupt device, the energy storage device being connected in series between the current sensor and the current interrupt circuit.

11. The energy storage apparatus according to claim 10, wherein the discharge circuit includes a diode and an auxiliary current interrupt device connected in series with the diode, such that when the current interrupt device is in the interruption state, current in a forward direction toward the vehicle load from the energy storage device flows through the diode.

12. The energy storage apparatus according to claim 11, wherein the auxiliary current interrupt device comprises one of a mechanical switch and a field effect transistor (FET) switch and is disposed between the energy storage device and the diode, an end of the auxiliary current interrupt device being connected to the energy storage device and another end of the auxiliary current interrupt device being connected to the diode.

13. The energy storage apparatus according to claim 11, further comprising:

a positive electrode terminal, the current interrupt circuit being connected to the positive electrode terminal; and a negative electrode terminal, the current sensor being connected to the negative electrode terminal.

14. The energy storage apparatus according to claim 13, further comprising:

a battery management unit comprising the control unit and the voltage detection circuit which is connected to the energy storage device and first and second ends of the current interrupt circuit.

15. The energy storage apparatus according to claim 14, wherein the voltage detection circuit detects a voltage between the first and second ends of the current interrupt circuit in response to an instruction from the control unit.

16. The energy storage apparatus according to claim 15, wherein the energy storage device comprises a plurality of energy storage devices which are connected in series, and wherein the control unit comprises:

a central processing unit (CPU) which executes the interruption process;

a memory which stores individual and total overdischarge voltage thresholds of the plurality of energy storage devices, and individual and total overcharge voltage thresholds of the plurality of energy storage devices; and a current detection unit which detects current flowing through the plurality of energy storage devices through the current sensor.

17. The energy storage apparatus according to claim 16, wherein the auxiliary current interrupt device is activated in response to an instruction from the CPU so as to cause the plurality of energy storage devices and the diode to be in a conduction state or in an interruption state.

18. The energy storage apparatus according to claim 16, wherein the memory further stores:
   a misuse determination program; and
   a switching maximum value comprising the predetermined value of the number of times that the switching instruction process is executed during the predetermined period of time.

19. The energy storage apparatus according to claim 18, wherein the CPU:
   counts a number of times that the switching instruction process is executed during the predetermined time; and
   compares the counted number of times to the switching maximum value stored in the memory.

20. The energy storage apparatus according to claim 1, wherein in the interruption maintaining process, the control unit determines whether the vehicle is in a parked state after determining that the energy storage device is misused.

21. The energy storage apparatus according to claim 20, wherein the control unit comprises a current detection unit that detects current between the vehicle load and the energy storage device, and determines that the vehicle is in a parked state when the current detected by the current detection unit has been continuously less than a predetermined value for a predetermined period of time, and
   wherein when the control unit determines that the vehicle is not in a parked state, the control unit keeps monitoring whether the current has been continuously less than the predetermined value for a predetermined period of time.

22. A method for determining misuse of an energy storage device in an energy storage apparatus which includes the energy storage device which is able to be charged and connected to a vehicle load and a vehicle power generator which are mounted on the vehicle, a current interrupt device that causes current between the energy storage device and the vehicle load or current between the energy storage device and the vehicle power generator to be in a conduction state or in an interruption state in which charging of the energy storage device is inhibited, and a voltage detection unit that detects voltage of the energy storage device, the method comprising:
   a switching instruction process in which an interruption switching instruction for switching to the interruption state is issued to the current interrupt device, when it is determined that the energy storage device will reach an overcharge state or has reached an overcharge state on the basis of the voltage detected by the voltage detection unit; and
   a determination process in which:
      when the number of times that the switching instruction process is executed exceeds a predetermined value in a predetermined period of time, it is determined that the energy storage device is misused: and
      when the vehicle is in a parked state, an instruction to maintain the interruption state is issued to the current interrupt device.

* * * * *